(12) United States Patent
Kraus

(10) Patent No.: US 7,474,065 B2
(45) Date of Patent: Jan. 6, 2009

(54) CONTROLLING AN ELECTRIC MOTOR HAVING MULTIPLE OSCILLATORY ELEMENTS

(75) Inventor: Bernhard Kraus, Braunfels (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 11/327,916

(22) Filed: Jan. 9, 2006

(65) Prior Publication Data

US 2006/0145547 A1 Jul. 6, 2006

Related U.S. Application Data

(63) Continuation of application No. PCT/EP2004/006198, filed on Jun. 9, 2004.

(30) Foreign Application Priority Data

Jul. 9, 2003 (DE) .................. 103 30 979

(51) Int. Cl.
  *H02K 33/00* (2006.01)
  *H02P 1/00* (2006.01)
  *H02P 3/00* (2006.01)
  *H02P 5/00* (2006.01)
  *H02P 7/00* (2006.01)

(52) U.S. Cl. ....................... 318/119; 318/135

(58) Field of Classification Search ............... 318/119
  See application file for complete search history.

(56) References Cited

U.S. PATENT DOCUMENTS

| | | | |
|---|---|---|---|
| 5,632,087 A | 5/1997 | Motohashi et al. | |
| 5,955,799 A * | 9/1999 | Amaya et al. | ............ 310/36 |
| 6,133,701 A | 10/2000 | Gokturk et al. | |
| 6,774,588 B2 * | 8/2004 | Ibuki et al. | ............ 318/119 |
| 2002/0101125 A1 | 8/2002 | Ibuki et al. | |
| 2002/0175643 A1 | 11/2002 | Gokturk | |

FOREIGN PATENT DOCUMENTS

| | | |
|---|---|---|
| DE | 1 151 307 | 7/1963 |
| FR | 72.13342 | 11/1973 |
| JP | 07 265 559 | 10/1995 |

* cited by examiner

*Primary Examiner*—Walter Benson
*Assistant Examiner*—Erick Glass
(74) *Attorney, Agent, or Firm*—Fish & Richardson P.C.

(57) ABSTRACT

A method of controlling an electric motor includes providing an electric motor having a plurality of magnetically driven oscillatory elements having differing oscillatory characteristics, and an electromagnet having a coil arranged to drive all of the oscillatory elements. The method includes supplying an electric signal to the electromagnet, which creates a magnetic field that drives the oscillatory elements. The method also includes varying a frequency of the electric signal for individual control of oscillatory movements of the oscillatory elements.

27 Claims, 3 Drawing Sheets

CONTROLLING AN ELECTRIC MOTOR HAVING MULTIPLE OSCILLATORY ELEMENTS

REFERENCE TO RELATED APPLICATIONS

This application is a continuation of PCT application PCT/EP2004/006198, filed Jun. 9, 2004 and designating the United States, and claims priority under 35 USC § 119(a) from German patent application 103 30 979.9, filed Jul. 9, 2003. The complete disclosures of both priority applications are incorporated herein by reference.

TECHNICAL FIELD

This invention relates to a method of controlling an electric motor having a plurality of magnetically driven oscillatory elements and devices having such motors.

BACKGROUND

Electric motors having a multitude of oscillatory motor components are known in the art. Furthermore, it is known in the art to employ electric motors of this type in electric appliances, such as electric shavers and electric toothbrushes.

For example, an electric motor of this type is described in German patent publication 1 151 307 A which discloses an oscillating armature drive for a dry shaving apparatus. The oscillating armature drive includes a reciprocating shaving cutter and a U-shaped electromagnet formed fast with a housing of the shaving apparatus. A working armature and compensating armatures, adjacent the work armature on opposing sides, are arranged in an oscillatory manner near the poles of the electromagnet. In operation, the working armature, which drives the shaving cutter, oscillates in parallel with the pole faces of the electromagnet, and the compensating armatures oscillate in opposite phase with the working armature to prevent the transmission of oscillations from the working armature to the housing of the shaving apparatus.

As another example, U.S. Pat. No. 5,632,087 discloses a dry shaver with a linear motor. The linear motor has a stator coil and several rotors equipped with permanent magnets which are excited into a state of linear oscillation by the stator coil. The displacements of the rotors are detected by means of detectors associated with the rotors and are further processed in the form of an average value. In the process, the supply of current to the stator coil is controlled as a function of the average value in such a way that the oscillation amplitudes of all rotors are maintained as constant as possible. The detectors each comprise one permanent magnet which is positioned on the respective rotor and one positionally fixed sensor coil in which an induction voltage dependent on the velocity of the respective rotor is generated as a result of the effect of the permanent magnet.

SUMMARY

Various aspects of this invention include an electric motor having a plurality of oscillatory elements, wherein the oscillatory movements of the oscillatory elements are individually controlled.

According to one aspect of the invention, a method of controlling an electric motor includes providing an electric motor having a plurality of magnetically driven oscillatory elements having differing oscillatory characteristics, and an electromagnet having a coil arranged to drive all of the oscillatory elements. The method includes supplying an electric signal to the electromagnet, which creates a magnetic field that drives the oscillatory elements. The method also includes varying a frequency of the electric signal for individual control of oscillatory movements of the oscillatory elements. According to this aspect, all drive motions (i.e., oscillatory movements) can be generated by means of a shared electromagnet, the magnetic field of which acts upon the magnetically driven oscillatory elements, and thus drives the oscillatory elements directly. Therefore, a variety of drive functions can be made available by means of a single motor having a simple mechanical and magnetic layout. A gearing or other auxiliary means of influencing the drive motions is not required, and, as a result, cost and attendant frictional losses can be minimized. The electric signal can enable the magnetic field to unfold a different effect on each of the individual oscillatory elements. Therefore, with comparatively low outlay, several individually controllable drive motions can be made available.

In some cases varying the frequency of the electric signal can include presetting the frequency of the electric signal. The effect that the magnetic field has on the oscillatory elements depends upon the oscillatory characteristics of the latter, therefore, the magnetic field unfolds a different effect on each oscillatory element. Therefore, by setting the frequency of the electric signal it is possible to individually control the oscillatory movements of the oscillatory elements.

In some embodiments, the electric signal includes a plurality of individual frequencies. Preferably, the oscillatory movements of the oscillatory motor components are individually controlled by weighting the individual frequencies in the electric signal. More preferably, the differing oscillatory characteristics of the oscillatory elements include differing resonant frequencies. In some cases, the individual frequencies correspond to the resonant frequencies of the oscillatory elements. Depending on the magnitude by which the signal frequency deviates from the individual resonant frequencies, the oscillatory movements of the oscillatory elements are influenced differently by the magnetic field generated using the signal. In this way the oscillatory movements of the oscillatory elements can be varied almost independently of each other and through wide control ranges.

In some instances, the electric signal can be supplied to the electromagnet in the form of pulses. In this case, the oscillatory movements of the oscillatory elements can be individually controlled by presetting a pulse pattern for the electric signal which is supplied to the electromagnet. The use of pulses provides for signal generation with very little outlay, and, therefore, the method can also be used to control electric motors for small electric appliances, e.g., electric shavers and electric toothbrushes, which do not have a mains supply connection and are operated by means of rechargeable batteries or non-rechargeable batteries.

In some implementations, the oscillation amplitudes of the oscillatory elements can be individually controlled by the electric signal. In some cases, the oscillation amplitudes of the oscillatory elements can be reduced down to zero so that the oscillatory elements are switched on or off individually by the electric signal. In this way, an automated means of switching individual drive functions on and off can be achieved without additional outlay in terms of apparatus.

In some embodiments, the method includes detecting characteristic data of the oscillatory movements of the individual oscillatory elements. In this case, the characteristic data can be detected by one or more sensors. Preferably, the detected characteristic data is delivered from the sensors to a microcontroller. More preferably, the microcontroller controls the frequency of the electric signal. Even more preferably, the microcontroller compares the detected characteristic data with setpoint data values and controls the frequency of the electric signal such that any deviation from the setpoint data values is minimized. In some cases, the amplitude and/or frequency and/or phase of the oscillatory movements of the individual oscillatory elements can serve as the characteristic data. In some cases, the electric signal is generated as a function of the detected characteristic data, preferably, the electric signal is generated in a closed control loop. This approach makes it possible to achieve more precise control of the oscillatory movement.

According to another aspect, an electric appliance includes a housing and an electric motor contained within the housing. The electric motor includes a plurality of magnetically driven oscillatory elements, and an electromagnet having a coil arranged to drive all of the oscillatory elements. The electric appliance also includes a control device configured to deliver an electric signal to the electromagnet for generating a magnetic field that influences oscillatory movements of the oscillatory elements. Notably, the oscillatory elements have differing oscillatory characteristics, and the control device is arranged to control different aspects of the electric signal to control different ones of the oscillatory elements.

In some cases, the differing oscillatory characteristics include differing resonant frequencies, and the different aspects of the electric signal include signal components of differing frequencies.

In some embodiments, each oscillatory element includes a plurality of permanent magnets secured to a carrier plate. In this case, the permanent magnets of each oscillatory element can be arranged adjacent each other in an anti-parallel configuration. Preferably, the carrier plate has a first end connected to the housing by a first spring element, and a second end, opposite the first end, connected to the housing by a second spring element.

In some embodiments, the oscillatory elements are configured for linear oscillatory movement. For example, this could be the case with an electric shaver.

In some cases, the control device includes a microcontroller. Preferably, the electric appliance also includes one or more sensors for measuring characteristic data of the motor and supplying the measured data to the microcontroller. More preferably, the microcontroller compares the measured characteristic data with setpoint data values and adjusts the electric signal to minimize deviation from the setpoint data values.

In some examples, the electromagnet includes a magnetizable core and a coil wound about the magnetizable core, wherein the magnetizalbe core includes one of the oscillatory elements. Therefore, the magnetizable core can perform the function of a conventional stator, albeit without being stationary. This allows the magnetizable core to perform a drive function, and the transmission of unwanted vibrations from the electric motor to the housing can be minimized. Preferably, the magnetizable core is configured for movement relative to the coil. This means that the coil can be arranged in a stationary manner and can therefore be contacted more easily than a movable coil. Furthermore, the oscillating mass can be kept relatively low, as the coil does not co-oscillate.

In some implementations, the oscillatory elements are configured for rotary oscillatory movement. For example, this could be the case with an electric toothbrush.

Other features and advantages of the invention will be apparent from the following detailed descript, and from the claims.

DETAILED DESCRIPTION

Figure 1:
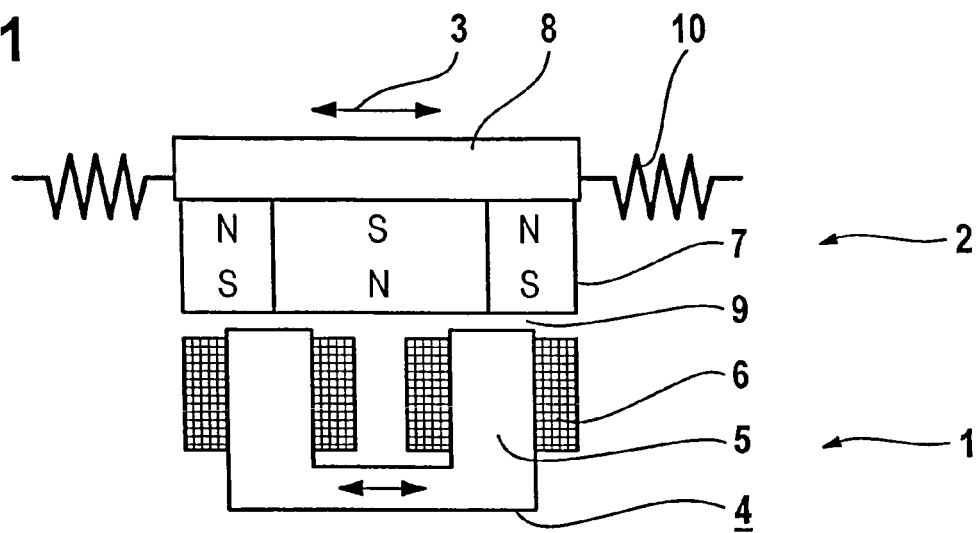
FIG. 1 is a schematic side view of an embodiment of a linear oscillation motor.
Figure 2:
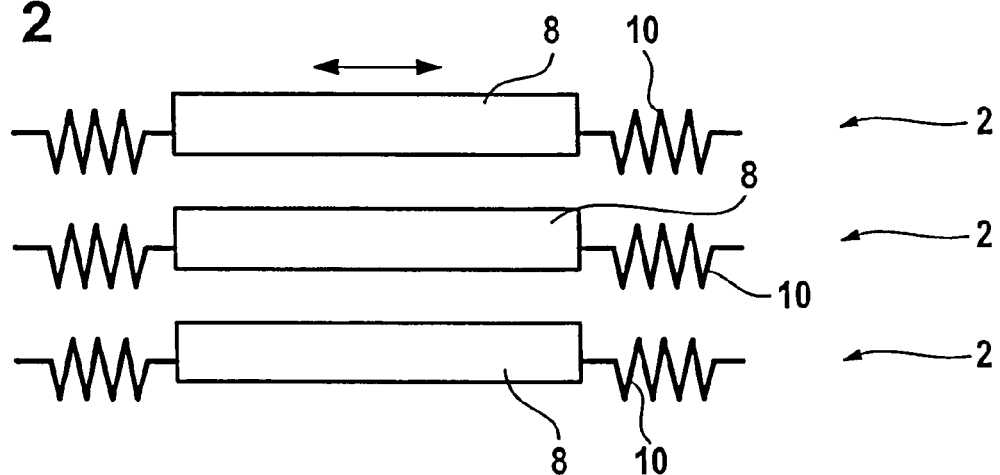
FIG. 2 is a schematic plan view of oscillatory elements of the embodiment of FIG. 1.

FIG. 1 shows an embodiment of a linear oscillation motor in a schematic side view. The linear motor has a stationary stator (i.e., electromagnet) 1 and three oscillatory elements or rotors 2 each capable of performing a linear oscillatory movement. As the three oscillatory elements 2 are arranged one behind the other, only the foremost oscillatory element 2 can be seen in the representation of FIG. 1. FIG. 2 shows the oscillatory elements 2 in a schematic plan view, with all three oscillatory elements 2 being visible in FIG. 2. The oscillatory movements of the oscillatory elements 2 are illustrated in FIGS. 1 and 2 by means of a double arrow 3. The stator 1 is comprised of an iron core 4 which is formed in a "U" shape and has two legs 5, around each of which part of a coil 6 is wound. The coil 6 is shown in a sectional view to offer a view of the iron core 4. The two parts of the coil 6 are electrically connected to each other and can also be spatially arranged together, for example by being wound around the crossbar which connects the two legs 5 of the iron core 4. The oscillatory elements 2 each have three permanent magnets 7 resting with one of their poles against a carrier plate 8, said three permanent magnets being arranged closely next to each other in an anti-parallel layout. The permanent magnets 7 are positioned close to the ends of the legs 5 of the iron core 4 leaving only an air gap 9. The carrier pates 8 are made of an iron material just like the iron core 4, and they are each connected at two opposing sides with one end of a spring 10 each. The other ends of the springs 10 are fixedly suspended, for example on a housing of an electric appliance not shown in the illustration, in which the linear motor is installed such that the oscillatory elements 2 can execute the linear oscillatory movement described by the double arrow 3.

With the linear motor in operating mode, an electric signal is supplied to the coil 6, as a result of which a flow of current is generated through the coil 6 and a magnetic field develops in the iron core 4. Particularly in the area of the ends of the legs 5 of the iron core 4, the magnetic field acts upon the permanent magnets 7 and effects, in the geometry shown in FIG. 1, a lateral displacement of the oscillatory elements 2 in relation to the stator 1. The direction of the displacement depends upon the direction of the current in the coil 6. By means of a variation of the current flow through the coil 6, during which as a rule the current direction is also varied, and also under assistance from the springs 10, the oscillatory elements 2 can be excited into linear oscillatory movement. The oscillatory action of the oscillatory elements 2 is shown in FIG. 3.

Figure 3:
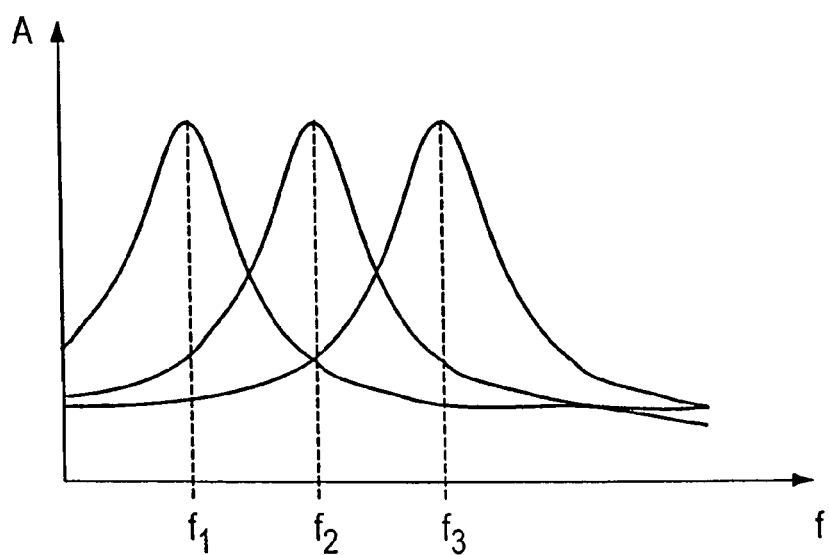
FIG. 3 is a diagram illustrating the oscillatory action of the linear oscillation motor illustrated in FIGS. 1 and 2.

FIG. 3 shows a diagram which illustrates the oscillatory action of the linear oscillation motor shown in FIGS. 1 and 2. In this Figure, the excitation frequency f is assigned to the abscissa and the amplitude A of the oscillation movement is assigned to the ordinate, and one curve showing the frequency response of the oscillation amplitude A is entered for each of the three oscillatory elements 2. The three curves all have a similar shape characterized by a maximum oscillation amplitude A at the resonant frequency f1, f2 and f3, respectively, and a decrease in amplitude A with increasing distance of the resonant frequency f1, f2 and f3 to low and high excitation frequencies f. The three curves are offset relative to each other due to the different resonant frequency f1, f2 and f3 of the three oscillatory elements 2.

As becomes directly apparent from FIG. 3, the degree to which the individual oscillatory elements 2 are set in an oscillatory motion depends in each case on the selected excitation frequency f. For example, whichever oscillatory element 2 has a resonant frequency f1, f2, f3 which is closest to the selected excitation frequency f is brought to oscillate the most. At the same excitation, the other two oscillatory elements 2 develop only a lower oscillation amplitude A or are possibly not excited to oscillate at all. If, for example, the excitation frequency f is exactly in the mid-position of the resonant frequencies f1 and f2 or f2 and f3 of two oscillatory elements 2, then these oscillatory elements 2 are excited to oscillate with the same amplitude A. Through appropriate choice of the excitation frequency f it is therefore possible to individually adjust the oscillation amplitudes A of the three oscillatory elements 2. However, these oscillation amplitudes A cannot be adjusted at will by means of a single excitation frequency f, as only those combinations of oscillation amplitudes A of the three oscillatory elements 2 can be set up which result as intersections between the curves shown in FIG. 3 and a vertical line drawn at the excitation frequency f.

Within the framework of the limits set by the system parameters, it is possible to adjust the oscillation amplitudes A of the three oscillatory elements 2 at will by using multiple excitation frequencies f. For example, three excitation frequencies can be used corresponding to the three resonant frequencies f1, f2 and f3 of the oscillatory elements 2. The oscillation amplitudes A thereby achieved at the oscillatory elements 2 depend in each case on the amplitudes of the excitation signals. Depending on the sharpness of resonance, each excitation signal may also effect a small influence on the other two oscillatory elements 2. The concrete application of the above described principles for individual control of the oscillatory movement of the oscillatory elements 2 will be explained with reference to FIG. 4.

Figure 4:
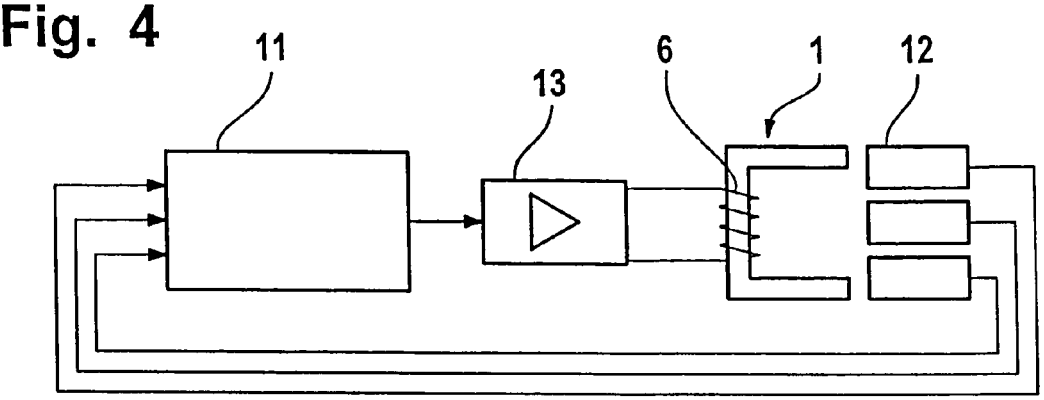
FIG. 4 is a block diagram illustrating the control method of the invention.

FIG. 4 shows a simplified block diagram for illustration of the control principle of the invention. The electric signal required to drive the coil 6 of the stator 1 is generated by a microcontroller 11. To do this, measuring data is supplied from three sensors 12 to the microcontroller 11. Instantaneous values for oscillation amplitude, frequency and phase position of the oscillatory elements 2 are detected by the sensors 12. The microcontroller 11 compares each of these instantaneous values with preset setpoint values and drives the coil 6 such that for each of the three oscillatory elements 2 deviation from the setpoint values can be reduced. To do this, the microcontroller 11 generates three electric oscillation signals, the frequencies of which match the resonant frequencies of the three oscillatory elements 2. The amplitudes of the electric oscillation signals depend on the previously detected deviations of the instantaneous values detected by the sensors 12 from the setpoint values. The electric oscillation signals are superimposed to form a composite signal which is fed into the coil 6 by means of a power amplifier 13. The coil 6 thus receives an electric signal with three frequency components, each of which may have a different amplitude, and generates a corresponding magnetic field which acts upon the three oscillatory elements 2. The three oscillatory elements 2 are influenced differently depending on the frequency components contained in the magnetic field, and their oscillation states are individually adjusted in this way. The achieved result is monitored in each case by means of the sensors 12, and, depending on the requirements, further correcting interventions are made by suitably driving the coil 6. A notable feature of the described approach lies in the fact that all three oscillatory elements 2 can be controlled via the same coil 6, yet the individual oscillatory elements 2 can be controlled individually. Ultimately, this is enabled by the different oscillation properties, in particular the different resonant frequencies, of the oscillatory elements 2. Details relating to the driving of the coil 6 will be explained with reference to FIGS. 5, 6 and 7.

Figure 5:
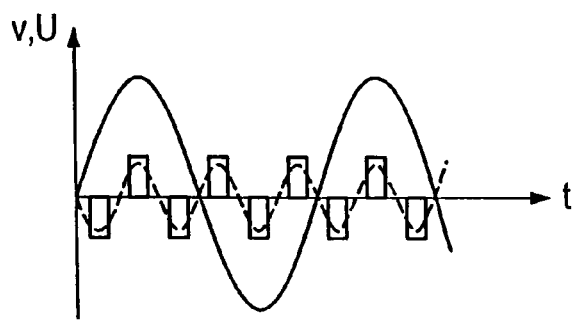
FIGS. 5, 6, 7 are diagrams illustrating the individual control of two oscillatory elements of a linear motor.
Figure 6:
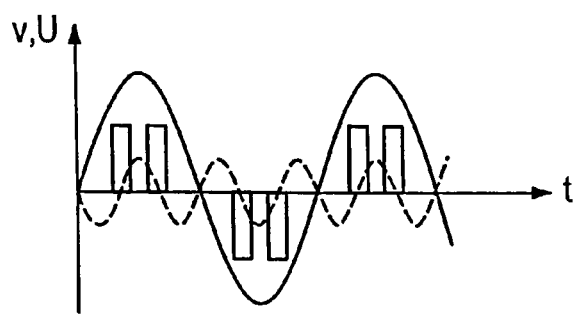
Figure 7:
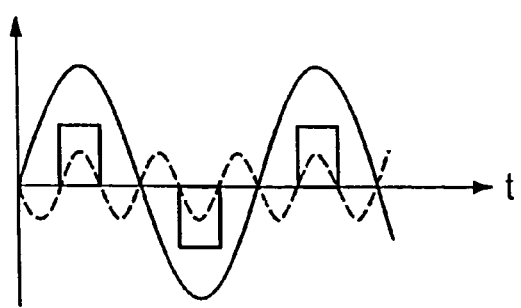

FIGS. 5, 6 and 7 show diagrams which illustrate the individual control of two oscillatory elements 2 of a linear motor. The time t is plotted on the abscissa and the velocity v of the oscillatory elements 2 and the voltage U of the signal generated by the microcontroller 11 are plotted on the ordinate. The first oscillatory element 2 oscillates with a high amplitude and a low frequency. The associated variation of velocity v with time is shown in each case as a solid line. The second oscillatory element 2 oscillates with a significantly lower amplitude and a frequency which is three times the frequency of the first oscillatory element 2. The variation of velocity v with time of the second oscillatory element 2 is shown as a dashed line. The signal generated by the microcontroller 11 comprises a sequence of square-wave pulses. The square-wave pulses are easier to generate than for example sinusoidal signals.

FIG. 5 shows a situation in which positive square-wave pulses each coincide with the maxima, and negative square-wave pulses each coincide with the minima of the curve shown with a dashed line. This means that the electric signal effects a continual acceleration of the oscillatory element 2 which is oscillating at a higher frequency, and consequently the oscillation movement of this oscillatory element 2 is intensified. In relation to the curve shown with a solid line, some of the square-wave pulses have the same sign and some have the opposite sign, as a result of which the accelerating and decelerating effects of the electric signal are approximately cancelled out in the case of the oscillatory element 2 which is oscillating at a lower frequency, which means that the oscillation movement of this oscillatory element 2 is not significantly affected by the electric signal.

FIG. 6 shows a situation in which some of the square-wave pulses coincide with some of the zero crossings of the curve shown with a dashed line, as a result of which the accelerating and decelerating components of the electric signal cancel each other out exactly for the oscillatory element 2 which is oscillating at a higher frequency. In relation to the curve shown with a solid line, the positive square-wave pulses are positioned close to the maxima and the negative square-wave pulses are positioned close to the minima. Consequently, the oscillatory element 2 which is oscillating with the lower frequency experiences in each case an acceleration by the electric signal.

As shown in FIG. 7, both oscillatory elements 2 are accelerated, as the positive square-wave pulses coincide with the maxima and the negative square-wave pulses coincide with the minima of both curves. Therefore, by choosing the phase position of the square-wave pulses in relation to the oscillation movements of the two oscillatory elements 2, it is possible to act on the oscillatory elements 2 individually.

The control method of the invention may also be used for the control of a linear oscillation motor which does not have a stationary stator 1, but instead has an additional rotor which is constructed in the same design as the stator 1 but is movable. Such a statorless linear oscillation motor is shown in FIG. 8.

Figure 8:
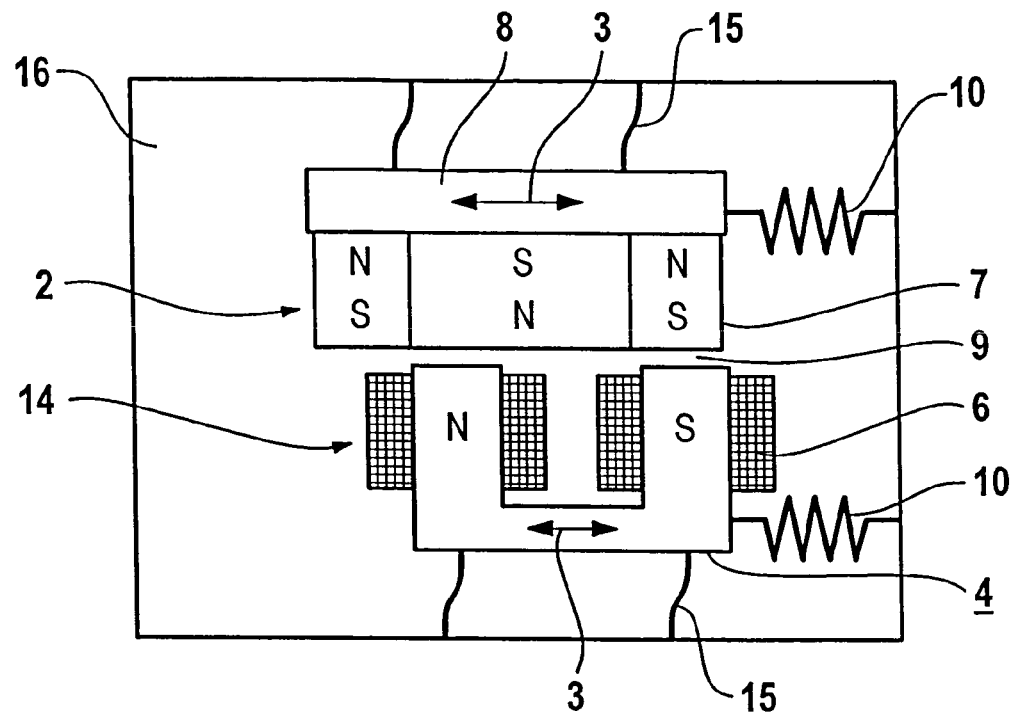
FIG. 8 is a schematic side view of an embodiment of a statorless linear oscillation motor.

FIG. 8 shows an embodiment of a statorless linear oscillation motor in a schematic side view. Instead of the stator 1 of the embodiment shown in FIG. 1, the embodiment shown in FIG. 8 has a component which is referred to in the following as the active rotor 14. The active rotor 14 is constructed in the same design as the stator 1 of the embodiment shown in FIG. 1 and serves in analogous fashion to generate a magnetic field, with the aid of which the oscillatory element 2 is driven. However, the special feature of the active rotor 14 is that, unlike stator 1, it is not stationary, being instead suspended for movement via oscillating bridges 15 on a housing 16 of the electric appliance. The oscillating bridges 15 can be leaf springs which have a relatively low spring constant and therefore only form a weak coupling to the housing 16. Furthermore, the active rotor 14 is connected via a spring 10 to the housing 16 in order to obtain an oscillatory system. The oscillatory element 2, which is constructed identically to the embodiment shown in FIG. 1, is connected in corresponding fashion via oscillating bridges 15 and a spring 10 to the housing 16. In this arrangement, provision can be made for a single oscillatory element 2 or several oscillatory elements 2.

In terms of its mode of operation, the embodiment shown in FIG. 8 differs from the embodiment of FIG. 1 in that the active rotor 14 is likewise set in an oscillatory motion. As this occurs, the oscillatory motion of the active rotor 14 is in phase opposition to the oscillatory motion of the oscillatory element 2. With regard to the individual control of the oscillatory movements, the statements made in relation to the embodiment of the linear motor shown in FIG. 1 with the stator 1 also apply to the present embodiment with the active rotor 14, with the active rotor 14 acting in the manner of an oscillatory element 2 in terms of its oscillatory motion.

The embodiments of a linear oscillation motor described above can for example find application in an electric shaver. This applies to both the embodiment shown in FIG. 1 with the stator 1 and the embodiment shown in FIG. 8 with the active rotor 14. For example, in the case of the embodiment shown in FIG. 1, two oscillatory elements 2 can each be connected to a shaving cutter and drive the latter with the same frequency and the same constant amplitude. Unless further components of the electric shaver are to be driven, unlike the rotor arrangement shown for this embodiment in FIG. 2, only two oscillatory elements 2 are required. In this case the embodiment shown in FIG. 8 can be used in corresponding fashion. In this arrangement, the oscillatory element 2 and the active rotor 14 are each connected to one of the two shaving cutters. In both embodiments, the resonant frequencies of the two oscillatory systems, i.e., of the two oscillatory elements 2 or of the active rotor 14 and the oscillatory element 2 as well as the respective connected shaving cutters and the associated springs 10, are chosen to be slightly different. For driving the coil 6 an electric signal is generated containing only one frequency which lies between the two resonant frequencies. By modifying the frequency of the electric signal towards the one or the other resonant frequency, the amplitudes of the two oscillatory elements 2 or of the oscillatory element 2 and the active rotor 14 can be maintained constant even under load. Overall, the two oscillatory elements 2 or the oscillatory element 2 and the active rotor 14 are controlled in such a way that they oscillate with the same frequency, the same amplitude and in phase opposition to each other, which results in only relatively low housing vibrations. When using a linear motor in accordance with the embodiment shown in FIG. 1, it should be noted that the polarity of the magnet arrangements of the two oscillatory elements 2 can be different in each case in order to generate oscillations of opposite phase.

Furthermore, it is also possible to use the linear oscillation motor for driving a long-hair cutter and, as the case may be, also a middle cutter of the shaving apparatus. To do this, in the embodiment of the linear motor shown in FIG. 1 provision is made for a corresponding number of oscillatory elements 2, which drive the respective components of the shaving apparatus. In order to switch the long hair cutter or middle cutter on or off as required, the electric signal for driving the coil 6 is formed such that it additionally contains the resonant frequencies for the corresponding oscillatory systems, so that the oscillatory elements 2, which drive the long hair cutter or the middle cutter, can be selectively excited into a state of oscillation. In the process, those cutting devices where the resonant frequencies are not contained in the electric signal are not driven and are therefore in the off-state.

As well as being applicable to linear oscillation motors, the control method described above can also be applied to rotary oscillation motors.

Figure 9:
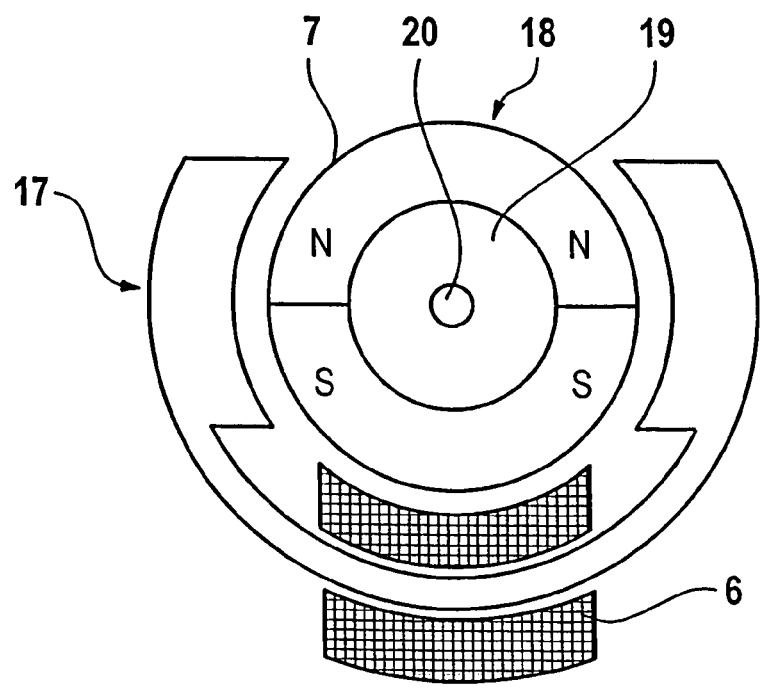
FIG. 9 is a schematic side view of an embodiment of a statorless rotary oscillation motor.

FIG. 9 shows an embodiment of a statorless rotary oscillation motor in a schematic side view. The statorless rotary motor has functional components similar to the statorless linear motor shown in FIG. 8. However, these functional components are modified in such a way that a rotary oscillating motion is generated instead of a linear oscillating motion. Accordingly, the statorless rotary motor has an outer rotor 17 which is rotatably suspended and is made of an iron material. The outer rotor 17 extends in part within the coil 6, although without touching the latter, as a result of which the outer rotor 17 can be rotated in relation to the stationary coil 6. Arranged within the outer rotor 17 is an inner rotor 18 that has a rotor core 19 made of an iron material and permanent magnets 7 attached thereto. The inner rotor 18 is also rotatably suspended, with the outer rotor 17 and the inner rotor 18 having a shared axis of rotation 20. Furthermore, the rotary motor also has a series of spring elements which are arranged between the outer rotor 17 and the housing 16 and between the inner rotor 18 and the housing 16 and are not shown in FIG. 9 for reasons of clarity. The rotary motor therefore has two oscillatory systems. With regard to the control of the rotary motor, the above explanations relating to the control of the linear motor apply analogously.

The rotary motor may be used for example as a drive for an electric toothbrush, with the embodiment of the rotary motor shown in FIG. 9 enabling two different brushing motions to be performed.

What is claimed is:

1. A method of controlling an electric motor, the method comprising:
   providing an electric motor comprising:
   a plurality of magnetically driven oscillatory elements each having a respective resonant frequency, wherein the resonant frequency of each oscillatory element is different from the respective resonant frequencies of all other oscillatory elements of the plurality, and
   an electromagnet having a coil arranged to drive all of the oscillatory elements;

supplying an electric signal to the electromagnet, thereby creating a magnetic field to drive the oscillatory elements; and individually controlling respective oscillation amplitudes of the oscillatory elements by varying a frequency of the electric signal.

2. The method according to claim 1, wherein varying the frequency of the electric signal comprises presetting the frequency of the electric signal.

3. The method according to claim 1, wherein the electric signal is a composite signal comprising a plurality of superimposed, individual frequencies.

4. A method of controlling an electric motor, the method comprising:

providing an electric motor comprising:

a plurality of magnetically driven oscillatory elements each having a respective resonant frequency, wherein the resonant frequency of each oscillatory element is different from the respective resonant frequencies of all other oscillatory elements of the plurality, and an electromagnet having a coil arranged to drive all of the oscillatory elements;

supplying a composite electric signal comprising a plurality of superimposed, individual frequencies to the electromagnet, thereby creating a magnetic field to drive the oscillatory elements; and individually controlling oscillatory movements of the oscillatory elements by weighting the individual frequencies of the electric signal.

5. The method according to claim 1, wherein the electric signal is supplied in pulses.

6. The method according to claim 5, wherein varying the frequency of the electric signal comprises presetting a pulse pattern for the electric signal.

7. The method according to claim 1, wherein varying the frequency of the electric signal comprises switching the oscillatory elements on and off individually.

8. The method according to claim 1, further comprising detecting characteristic data of the oscillatory movements of the individual oscillatory elements.

9. The method according to claim 8, wherein the characteristic data is detected by one or more sensors.

10. The method according to claim 9, wherein the detected characteristic data is delivered from the sensors to a microcontroller.

11. The method according to claim 10, wherein the microcontroller controls the frequency of the electric signal.

12. The method according to claim 11, wherein the microcontroller compares the detected characteristic data with setpoint data values and controls the frequency of the electric signal such that deviation from the setpoint data values is minimized.

13. The method according to claim 8, wherein the characteristic data is selected from the group consisting of amplitude, frequency and phase.

14. The method according to claim 8, wherein the electric signal is generated as a function of the detected characteristic data.

15. The method according to claim 14, wherein the electric signal is generated in a closed control loop.

16. The method according to claim 1, wherein individually controlling respective oscillation amplitudes comprises driving a first one of the oscillatory elements at a first oscillation amplitude that is different from the oscillation amplitude of at least one other one of the oscillatory elements.

17. The method according to claim 1, wherein individually controlling respective oscillation amplitudes comprises driving each of the oscillatory elements at a respective oscillation amplitude, wherein the oscillation amplitude of each oscillatory element is different from the respective oscillation amplitudes of all of the other oscillatory elements of the plurality.

18. The method according to claim 4, wherein the individual frequencies of the electric signal correspond to the resonant frequencies of the oscillatory elements.

19. The method according to claim 4, further comprising individually controlling respective oscillation amplitudes of the oscillatory elements.

20. The method according to claim 4, further comprising detecting characteristic data of the oscillatory movements of the individual oscillatory elements.

21. The method according to claim 20, wherein the characteristic data is detected by one or more sensors.

22. The method according to claim 21, wherein the detected characteristic data is delivered from the sensors to a microcontroller.

23. The method according to claim 22, wherein the microcontroller controls the individual frequencies of the electric signal.

24. The method according to claim 23, wherein the microcontroller compares the detected characteristic data with setpoint data values and controls the individual frequencies of the electric signal such that deviation from the setpoint data values is minimized.

25. The method according to claim 20, wherein the characteristic data is selected from the group consisting of amplitude, frequency and phase.

26. The method according to claim 20, wherein the electric signal is generated as a function of the detected characteristic data.

27. The method according to claim 26, wherein the electric signal is generated in a closed control loop.

* * * * *

UNITED STATES PATENT AND TRADEMARK OFFICE
CERTIFICATE OF CORRECTION

PATENT NO. : 7,474,065 B2 Page 1 of 1
APPLICATION NO. : 11/327916
DATED : January 6, 2009
INVENTOR(S) : Bernhard Kraus It is certified that error appears in the above-identified patent and that said Letters Patent is hereby corrected as shown below:

Column 9, Claim 7, Line 35;

Delete "claim 1 ," and Insert --claim 1,--

Signed and Sealed this

Twenty-fourth Day of February, 2009

JOHN DOLL
*Acting Director of the United States Patent and Trademark Office*